US012600311B2

(12) United States Patent
Kim et al.

(10) Patent No.: US 12,600,311 B2
(45) Date of Patent: Apr. 14, 2026

(54) VIDEO RECORD SYSTEM FOR VEHICLE, METHOD OF CONTROLLING THE VIDEO RECORD SYSTEM, AND USER TERMINAL

(71) Applicants: Hyundai Motor Company, Seoul (KR); Kia Corporation, Seoul (KR)

(72) Inventors: Hyun Sang Kim, Gyeonggi-do (KR); Yun Sup Ann, Gyeonggi-do (KR); Ho Tae Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/810,174

(22) Filed: Aug. 20, 2024

(65) Prior Publication Data

US 2025/0091541 A1     Mar. 20, 2025

(30) Foreign Application Priority Data

Sep. 15, 2023     (KR) ........................ 10-2023-0123209

(51) Int. Cl.
| | |
|---|---|
| *H04N 5/00* | (2011.01) |
| *B60R 21/0136* | (2006.01) |
| *H04W 4/40* | (2018.01) |
| *B60R 21/00* | (2006.01) |

(52) U.S. Cl.
CPC ........... *B60R 21/0136* (2013.01); *H04W 4/40* (2018.02); *B60R 2021/0027* (2013.01)

(58) Field of Classification Search
USPC ...................................................... 348/148
See application file for complete search history.

(56) References Cited

U.S. PATENT DOCUMENTS

| | | | | |
|---|---|---|---|---|
| 10,694,399 | B1 * | 6/2020 | Tran .......................... | G06N 3/08 |
| 10,812,992 | B1 * | 10/2020 | Tran .......................... | G06N 3/09 |
| 10,979,679 | B1 * | 4/2021 | Williams ............... | H04N 7/188 |
| 10,991,242 | B2 * | 4/2021 | Taylor ..................... | H04Q 9/00 |
| 2004/0155783 | A1 * | 8/2004 | Al-Sheikh .............. | G08B 21/22 |
| | | | | 340/584 |
| 2014/0375446 | A1 * | 12/2014 | Wanami ................. | G08G 1/205 |
| | | | | 340/436 |
| 2017/0088048 | A1 * | 3/2017 | Iwamoto .................. | B60Q 9/00 |
| 2019/0184825 | A1 * | 6/2019 | Kim ......................... | B60K 35/10 |
| 2019/0210548 | A1 * | 7/2019 | Levy ................. | H04M 1/72418 |
| 2020/0229137 | A1 * | 7/2020 | Rubin ..................... | H04W 4/46 |
| 2021/0097315 | A1 * | 4/2021 | Carruthers ....... | G08B 13/19645 |
| 2021/0287462 | A1 * | 9/2021 | Taylor ................. | G07C 5/0841 |

(Continued)

*Primary Examiner* — Nigar Chowdhury
(74) *Attorney, Agent, or Firm* — Fox Rothschild LLP

(57) ABSTRACT

A video record system, a method of controlling the video record system, and a user terminal may be implemented in a vehicle. The method of controlling the video record system includes: an impact sensor or a microphone; a camera module; a first memory that stores a video transmitted from the camera module; and a controller including a second memory that stores a computer program for controlling storage of the video, and a processor that executes the computer program, such that by executing the computer program, the processor may determine whether an impact is equal to or greater than a set value based on a signal obtained by the impact sensor or the microphone and attempt to be connected to a user terminal and transmit the video to the user terminal when it is determined that the impact is equal to or greater than the set value.

16 Claims, 3 Drawing Sheets

(56)                    References Cited

U.S. PATENT DOCUMENTS

| 2022/0075656 A1* | 3/2022 | Wittevrongel | G07C 5/085 |
| 2022/0371548 A1* | 11/2022 | Ohashi | H04B 17/318 |
| 2023/0347920 A1* | 11/2023 | Cserna | B60W 50/14 |
| 2023/0377387 A1* | 11/2023 | Hayes | G06Q 40/08 |
| 2024/0104928 A1* | 3/2024 | Gustof | H04N 7/181 |

* cited by examiner

VIDEO RECORD SYSTEM FOR VEHICLE, METHOD OF CONTROLLING THE VIDEO RECORD SYSTEM, AND USER TERMINAL

CROSS-REFERENCE TO RELATED APPLICATION

The present application claims under 35 U.S.C. § 119 (a) the benefit of Korean Patent Application No. 10-2023-0123209, filed on Sep. 15, 2023, the entire contents of which are incorporated by reference herein.

BACKGROUND

(a) Technical Field

The present disclosure relates to a video record system for a vehicle, a method of controlling the video record system, and a user terminal.

(b) Description of the Related Art

A drive video record system is a device that records a video about a driving situation of a vehicle.

The drive video record system may include a controller, a memory for storing images, and a camera for video shooting.

In general, the drive video record system stores vehicle driving data as well as a video of scenes around the vehicle while driving, and the drive video record system records a video according to a pre-inputted setting when an occurrence of a predetermined event is detected while parking.

The drive video record system has traditionally been referred to as a black box, but is sometimes built into a vehicle before the vehicle is released.

An accident video stored in the drive video record system may be played on an audio video navigation telecommunication (AVNT) screen in the vehicle or a screen of a separate device using an external memory card.

A car accident may cause a problem in a power system in the vehicle, and accordingly, it may become difficult to view the accident video in the drive video record system.

In particular, if a fire occurs in a vehicle due to a big accident, all the recorded images may be lost, and accordingly, it may become difficult to identify the cause of the accident.

The information included in this Background of the present disclosure section is only for enhancement of understanding of the general background of the present disclosure and may not be taken as an acknowledgement or any form of suggestion that this information forms the prior art already known to a person skilled in the art.

SUMMARY

Various aspects of the present disclosure are directed to allowing an accident video pertaining to a vehicle to be viewed, stored and moved in the case of an accident in which a video record system is damaged or recorded video data are lost due to a fire, by transmitting video data of the video record system to a user terminal.

In one aspect, a method of controlling a video record system includes: 1) providing the video record system including at least one of an impact sensor or a microphone, a camera module configured to monitor around a vehicle, a first memory configured to store a video transmitted from the camera module, a controller including a second memory configured to store a computer program for controlling storage of the video, and a processor configured to execute the computer program; 2) determining, by the processor executing the computer program, whether an impact is equal to or greater than a set value based on a signal obtained by the impact sensor or the microphone; and 3) attempting a communication connection to a user terminal and transmitting the video to the user terminal in response to determining that the impact is equal to or greater than the set value.

According to an embodiment of the present disclosure, there is provided a method of controlling a video record system including an impact sensor or a microphone, a camera module configured to monitor around a vehicle, a first memory configured to store a video transmitted from the camera module, and a controller including a second memory configured to store a computer program for controlling storage of the video, and a processor configured to execute the computer program. The method comprises determining, by the processor executing the computer program, whether an impact is equal to or greater than a set value based on a signal obtained by the impact sensor or the microphone and attempting a communication connection to a user terminal and transmitting the video to the user terminal in response to determining that the impact is equal to or greater than the set value.

In at least one embodiment of the present disclosure, the transmitting of the video to the user terminal includes determining whether there is a problem in a power supply from the vehicle, and attempting a communication connection to the user terminal by being supplied power from a capacitor in response to determining that there is the problem in the power supply.

In at least one embodiment of the present disclosure, the transmitting of the video to the user terminal further includes determining whether the user terminal is in a mode which allows a communication connection, and completing the communication connection by being supplied power from the capacitor.

In at least one embodiment of the present disclosure, the transmitting of the video to the user terminal further includes transmitting the video to the user terminal by being supplied power from the capacitor.

In at least one embodiment of the present disclosure, the attempting the communication connection to the user terminal includes attempting a communication connection through a Wi-Fi module.

In at least one embodiment of the present disclosure, the transmitting of the video to the user terminal includes requesting a user's selection of whether to allow the transmission.

In at least one embodiment of the present disclosure, the requesting of the user's selection includes requesting a user's selection of whether to allow the transmission through an audio video navigation telecommunication (AVNT).

In at least one embodiment of the present disclosure, the transmitting of the video to the user terminal further includes transmitting the video to the user terminal in response to the user's selection of allowing the transmission being input.

In at least one embodiment of the present disclosure, the transmitting of the video to the user terminal further includes transmitting an emergency situation notification together with the video to the user terminal in response to the user's selection not being input for more than a set time.

According to an embodiment of the present disclosure, there is provided a video record system comprising an impact sensor or a microphone, a camera module configured to monitor an area around a vehicle, a first memory configured store a video transmitted from the camera module, a controller including a second memory configured to store a computer program for controlling storage of the video, and a processor configured to execute the computer program. The processor is configured to determine whether an impact is equal to or greater than a set value based on a signal obtained by the impact sensor or the microphone, and attempt a communication connection to a user terminal and transmit the video to the user terminal in response to determining that the impact is equal to or greater than the set value, through executing the computer program.

In at least one embodiment of the video record system according to the present disclosure, the transmitting of the video to the user terminal includes determining whether there is a problem in a power supply from the vehicle, and attempting a communication connection to the user terminal by being supplied power from a capacitor in response to determining that there is the problem in the power supply.

In at least one embodiment of the video record system according to the present disclosure, the transmitting of the video to the user terminal further includes determining whether the user terminal is at a mode which allows a communication connection, and completing the communication connection by being supplied power from the capacitor.

In at least one embodiment of the video record system according to the present disclosure, the transmitting of the video to the user terminal further includes transmitting the video to the user terminal by being supplied power from the capacitor.

In at least one embodiment of the video record system according to the present disclosure, the attempting the communication connection to the user terminal includes attempting a communication connection through a Wi-Fi module.

In at least one embodiment of the video record system according to the present disclosure, the transmitting of the video to the user terminal includes requesting a user's selection whether to allow the transmission.

In at least one embodiment of the video record system according to the present disclosure, the requesting of the user's selection includes requesting a user's selection of whether to allow the transmission through an audio video navigation telecommunication (AVNT).

In at least one embodiment of the video record system according to the present disclosure, the transmitting of the video to the user terminal further includes transmitting the video to the user terminal in response to the user's selection of allowing the transmission being input.

In at least one embodiment of the video record system according to the present disclosure, the transmitting of the video to the user terminal further includes transmitting an emergency situation notification together with the video to the user terminal in response to the user's selection not being input for more than a set time.

A vehicle may include the video record system.

According to an embodiment of the present disclosure, there is provided a user terminal communication-connectable with a video record system including a first impact sensor or a microphone, a camera module configured to monitor around a vehicle, a first memory configured to store a video transmitted from the camera module, and a controller including a second memory configured to store a computer program for controlling storage of the video, and a processor configured to execute the computer program, wherein the user terminal is configured to switch a mode of the user terminal a communication-connectable mode in response to determining that an impact sensed by a second impact sensor included in the user terminal is equal to or greater than a set impact value, and receive the video which the processor transmits to the user terminal in response of determining whether an impact is equal to or greater than a set value based on a signal obtained by the first impact sensor or the microphone, and attempting a communication connection to the user terminal according to a result of the determining that the impact is equal to or greater than the set value, through the executing of the computer program.

In at least one embodiment of the user terminal according to the present disclosure, the user terminal is further configured to transmit the video to a set external device when the video is received.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

According to an embodiment of the present disclosure, in the case of an accident in which a video record system is damaged or recorded video data are lost due to a fire, video data of the video record system are transmitted to a user terminal so that the video can be viewed, stored and moved.

In addition, according to an embodiment of the present disclosure, the video transmitted to the user terminal may be transmitted to a pre-specified device such as a device of a call center or a smartphone of a family member, which can inform the outside of the accident situation.

Figure 1:
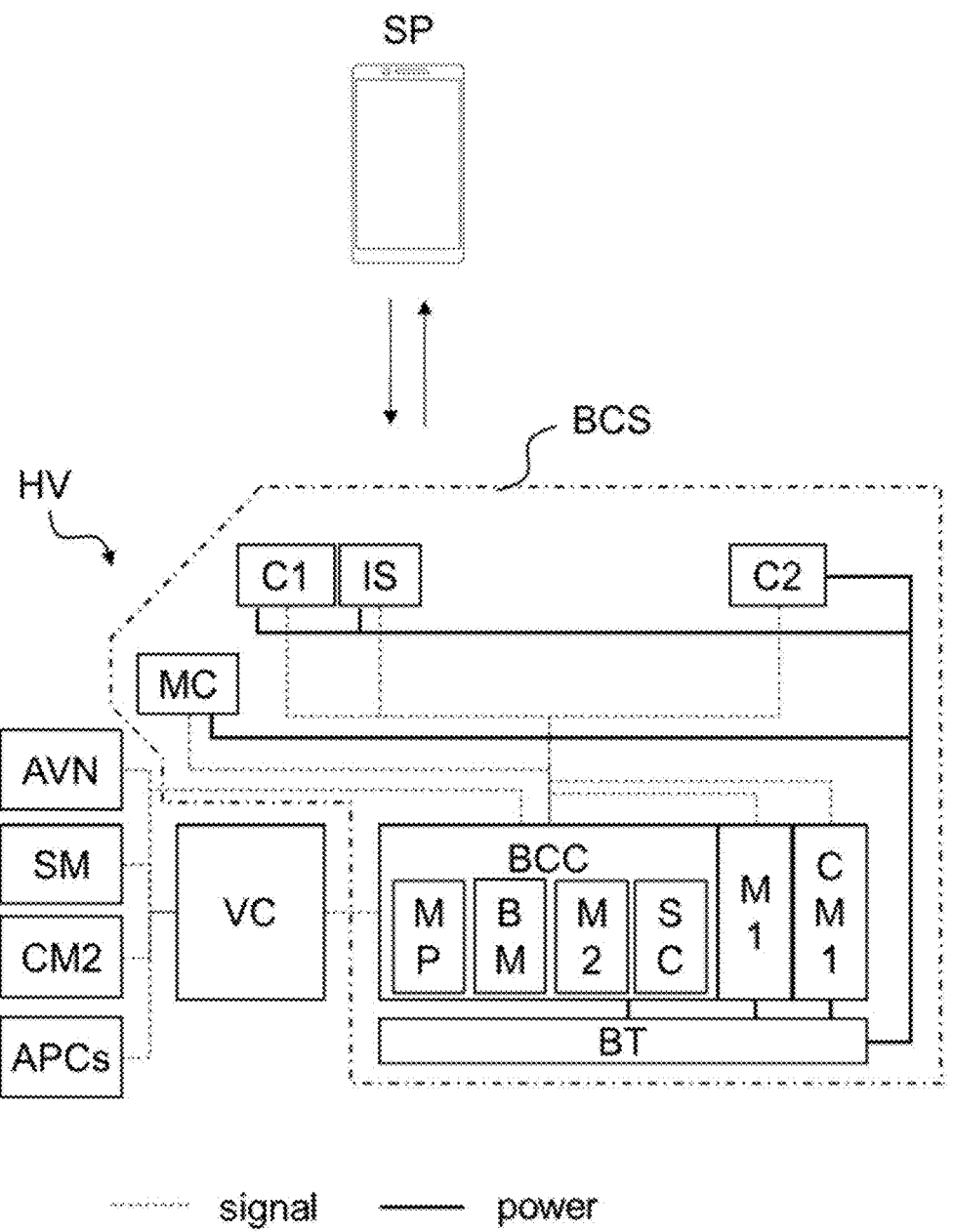
FIG. 1 is a block diagram conceptually illustrating a configuration of a drive video record system according to an embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, the same reference numerals refer to the same or equivalent parts of the present disclosure throughout the several figures of the drawing.

DETAILED DESCRIPTION OF ILLUSTRATIVE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure is modified in various ways and has various exemplary embodiments of the present disclosure, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for distinguishing one element from another element.

When an element is "connected" or "linked" to another element, it should be understood that the element may be directly connected or connected to another element, but another element may exist in between.

Unless otherwise defined, all terms used herein, including technical or scientific terms, include the same meaning as that generally understood by those skilled in the art. It will be understood that terms, such as those defined in commonly used dictionaries, should be interpreted as including a meaning which is consistent with their meaning in the context of the relevant art and will not be interpreted in an idealized or overly formal sense unless so defined herein.

Furthermore, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, to control a function in charge, and one or more processors performing calculation, comparison, determination, and the like necessary for controlling a function in charge.

For example, a system by these names may include a communication system that communicates with another controller or sensor to control a corresponding function, a computer-readable recording medium that stores an operating system or logic command, input/output information, etc., and one or more processors that perform calculation, comparison, determination, and the like necessary for controlling the corresponding function.

Meanwhile, the processor may include a semiconductor integrated circuit and/or electronic systems that perform at least one or more of comparison, determination, and calculation to achieve a programmed function. For example, the processor may be one of a computer, a microprocessor, a CPU, an ASIC, and a circuitry (logic circuits), or a combination thereof.

Furthermore, the computer-readable recording medium (or simply referred to as a memory) includes all types of storage devices in which data which may be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk. g The recording medium may be electrically connected to the processor, and the processor may retrieve and record data from the recording medium. The recording medium and the processor may be integrated or may be physically separated.

Hereinafter, the exemplary embodiments of the present disclosure will be described in detail with reference to the accompanying drawings.

Referring to FIG. 1, a built-in drive video record system, which is also referred to as a built-in cam system (BCS), according to an embodiment of the present disclosure is built into a vehicle, e.g., a host vehicle (HV), and may include a camera module, a computer-readable storage medium M1, a first communication module CM1, a microphone MC, a first impact sensor IS, a power auxiliary battery BT, and a built-in cam controller (BCC).

The drive video record system according to the present embodiment is a built-in type, but the embodiment is not limited thereto.

First, in the present embodiment, the camera module includes a front camera C1 and a rear camera C2, but the embodiment is not limited thereto. The front camera C1 is installed to capture the front area of the vehicle HV, and the rear camera C2 is installed to capture the rear area of the vehicle HV.

For example, the front camera C1 may be mounted at a location near a room mirror in the vehicle HV on the window shield, and the rear camera C2 may be mounted on a rear window or a rear bumper of the vehicle HV.

The front camera C1 and the rear camera C2 may support one of HD, FHD, and Quad HD image qualities.

Image qualities of the front camera C1 and the rear camera C2 may be same or different, and a camera of an advanced driving assistance system (ADAS) system of the host vehicle (HV) may also be used.

In addition, the camera has an aperture value below F2.0, preferably F1.6 or less. If the aperture value decreases, more light may be gathered, and accordingly, the recording be performed brightly. In addition, an image tuning technology is applied to minimize noise and light loss, and accordingly, a video may be recorded clearly even in dark environments.

A storage medium readable by a computer (hereinafter, briefly referred to as "memory") includes all kinds of storage devices that may store data and be read by a computer system. For example, the storage medium may include at least one of a flash memory, a hard disk type memory, a micro type memory, a card type memory, a secure digital (SD) card, an extreme digital (XD) card, a random access memory (RAM), a static RAM, a read-only memory (ROM), a programmable ROM (PROM), an electrically erasable PROM (EEPROM), a magnetic RAM (MRAM), a magnetic disk type memory, and an optical disk type memory.

In this embodiment, the memory M1 is a 64 or more gigabyte (GB) micro SD and is an external type memory. For example, constant recording during driving may be performed for several hours, and constant recording during parking may be performed up to tens of hours. Further, event recording according to impact detection may be performed up to tens of times. The event recording may include a recording according to occurrence of an impact during driving (hereinafter, also referred to as "impact recording during driving"), and a recording according to occurrence of an impact during driving (hereinafter, also referred to as "impact recording during parking"). Here, a state that a vehicle start switch is in an ignition on (IGN ON) state may be set as driving mode, and a state that the vehicle start switch is not in the ignition on (IGN ON) state may be set as parking mode.

A user may withdraw an SD card and easily check contents stored in the memory on a desktop computer, etc.

The state information of the SD card may be determined through a connected car service, and the changing time of the SD card according to the memory state may also be determined.

The first communication module CM1 is for wired or wireless communication with the outside, and is not limited to its communication protocol.

In the present embodiment, the first communication module CM1 includes a communication device that may be directly communicated with a peripheral device, and may, for example, support Wi-Fi. A Wi-Fi module of this embodiment may include an access point (AP) function, and the user may easily and quickly access a built-in camera through a smartphone.

A microphone (MC) supports voice recording. When recording a driving video of the vehicle HV, voice may also be recorded as well as the video.

The first impact sensor (IS) senses external impacts and may, for example, be a one-axis or three-axis acceleration sensor.

The first impact sensor (IS) may be provided exclusively for the built-in cam system (BCS), but it is apparent that the acceleration sensor installed in the host vehicle (HV) may be used.

The signal of the first impact sensor IS may become a criterion for a start of an event recording to be described later, and the size of the impact, which becomes the criterion, may be set by the user.

For example, the user may select the impact detection sensitivity, which become the event recording criterion when setting the built-in cam system (BCS) through the display screen (e.g., an AVNT screen to be described later) in the vehicle HV.

For example, the impact detection sensitivity may be divided into five levels: level 1 (very insensitive), level 2 (insensitive), level 3 (normal), level 4 (sensitive), and level 5 (very sensitive).

The built-in cam system (BCS) may receive power from a battery (e.g., a 12 V battery) installed in the vehicle HV.

The system may be operated by receiving power from the vehicle battery not only while driving but also while parked, but since there may be a problem of overconsumption of the vehicle battery, a power auxiliary battery BT is included in this embodiment.

In this embodiment, the built-in cam system (BCS) receives power from any one of the vehicle HV battery, an alternator in the case of an internal combustion engine vehicle, or a lower DC/DC converter (LDC) in the case of an electric vehicle while driving, but receives power from the power auxiliary battery BT while parked.

The power auxiliary battery BT may be charged/discharged according to the vehicle operating environment and supplies optimal power for recording during parking and wireless software update (OTA software update).

The power auxiliary battery BT may be charged by the vehicle battery (low-voltage battery or high-voltage battery of an electric vehicle) or, in the case of an internal combustion engine vehicle, by an alternator.

The built-in cam controller (BCC) is a higher-hierarchy controller that controls other components of the built-in cam system (BCS), and exchanges signals with the controller VC of the host vehicle HV and/or a second communication module (vehicle communication module), a sensor module SM, component controllers (APCs), an audio video navigation telecommunication (AVNT), etc. For example, for such a signal exchange, a local interconnect network (LIN) or a controller area network (CAN) communication may be used.

Here, the sensor module SM may include one or more of a speed sensor, an acceleration sensor, a vehicle position sensor (e.g., a GPS receiver), a steering angle sensor, a yaw rate sensor, a pitch sensor, and a roll sensor, and component controllers (APCs) may include one or more of a turn signal controller, a wiper controller, an ADAS system controller, and an airbag controller.

The built-in cam controller (BCC) controls other components to perform constant recording during driving, constant recording during parking, event recording in which recording is performed according to impact signals of an impact sensor, etc.

When recording, driving information of the vehicle HV may be recorded together.

Here, vehicle HV driving information may include time, vehicle speed, gear position, turn signal information, impact detection degree (one of the five levels described above), global positioning system (GPS) location information, etc.

Vehicle driving information may be transmitted from the vehicle controller VC, but the information may also be received directly from the corresponding module or component of the vehicle HV. For example, vehicle speed may be directly received from the speed sensor of the vehicle HV, turn signal information may be directly received from the turn signal controller, and GPS location information may be received from the AVNT or GPS receiver.

As described above, event recording is performed when an event is detected while parking according to the impact detection sensitivity set by the user.

When recording an event, recording proceeds from a set time before the event occurs to a set time after the event occurs, and the set time may be selected by the user.

AVNT is connected to the built-in cam controller (BCC) through the vehicle controller VC or directly, and the AVNT screen may function as a user interface for the user to select various setting parameters of the built-in cam system (BCS).

The built-in cam controller (BCC) may transmit recorded content to an external server according to a set cycle, user selection, or the occurrence of a user-set event (e.g., degree of impact detection).

The built-in cam controller (BCC) may include a memory (M2) and a processor (MP) to perform its function.

Illustratively, the processor MP may include a semiconductor integrated circuit and/or electronic devices that perform at least one or more of comparison, judgment, operation, and decision to achieve a programmed function. For example, the processor MP may be any one or a combination of a computer, a micro MC processor, CPU, ASIC, and an electronic circuits (circuitry, logic circuits).

The memory M2 includes all types of storage devices in which data that may be read by a computer system is stored and may include at least one of a flash memory, a hard disk type memory, a micro type memory, a card type memory, a secure digital (SD) card, an extreme digital (XD) card, a random access memory (RAM), a static RAM, a read-only memory (ROM), a programmable ROM (PROM), an electrically erasable PROM (EEPROM), a magnetic RAM (MRAM), a magnetic disk type memory, and an optical disk type memory.

The operating software of the built-in cam controller (BCC) may be stored in the memory M2, and the processor MP performs the function of the built-in cam controller (BCC) by reading and executing the software.

Further, the built-in cam controller (BCC) may include a buffer memory (BM) for judgment, calculation, etc. in the processor MP.

Additionally, the built-in cam controller (BCC) may include a super capacitor (SC). When vehicle power is applied to the built-in cam controller (BCC), the super capacitor (SC) is charged.

When the power is suddenly cut off due to impact or damage, etc., the power charged in the super capacitor (SC) may be used to complete the video storage in progress.

For example, the super capacitor (SC) may have a charging capacity that can maintain the power of the built-in cam controller (BCC) for several to tens of seconds.

Meanwhile, the user terminal (SP) is a terminal that is portable by the user and may be connected to capable of communication connection with the video record system of this embodiment, and the examples of the user terminal (SP) may include a portable communication terminal, a smartphone, a smart watch, and a tablet PC.

The user terminal (SP) may be connected to the built-in cam system (BCS) by switching to the set communication connection mode.

For example, the user terminal (SP) includes a Wi-Fi module, and when converted to a Wi-Fi communication mode, Wi-Fi communication with the built-in cam system (BCS) is possible.

Additionally, the user terminal (SP) may include a second impact sensor, through which the amount of impact may be detected when an impact occurs.

Figure 2:
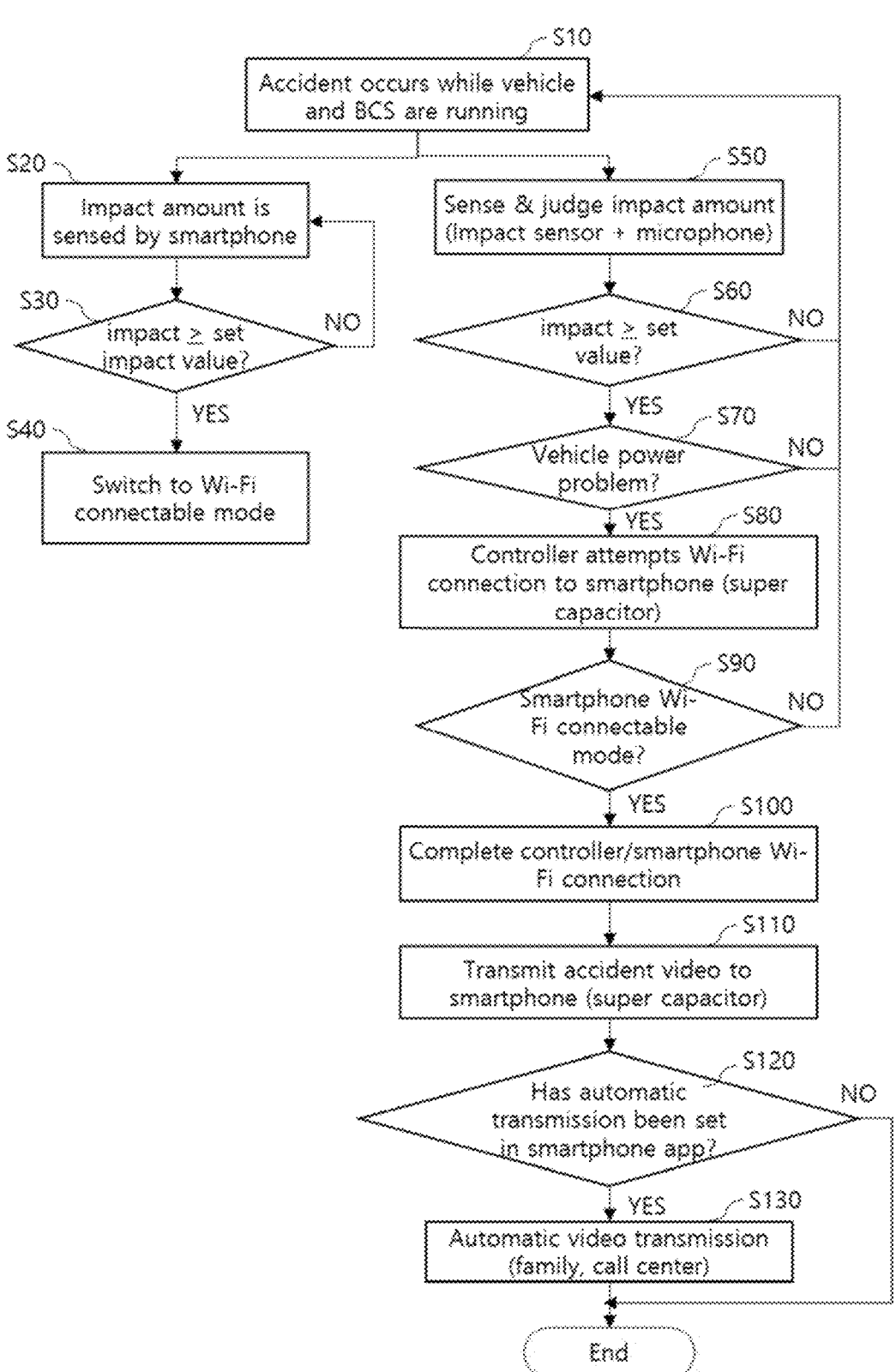
FIG. 2 shows a control process according to an embodiment of the present disclosure.

FIG. 2 shows the control process that occurs in the above-described built-in cam system (BCS) and the user terminal (SP) located in the vehicle (HV) according to an embodiment of the present disclosure, which will be described in detail below.

Prior to explanation, steps S20, S30, S40, S120, S130, etc. are processes performed in the user terminal (SP), and steps S50, S60, S70, S80, S90, S100, S110, etc. are control processes performed by the controller (BCC) in the built-in cam system (BCS).

Step S10 represents a situation in which an accident occurs while the vehicle (HV) is running and the built-in cam system (BCS) is operating.

When an accident occurs, the user terminal (SP) carried by the user in the vehicle (HV) detects the impact through the second impact sensor in step S20.

Then, the user terminal (SP) determines whether the impact is greater than or equal to the set impact value in step S30.

As the impact of the accident is determined to be greater than the set impact value in step S30, the user terminal (SP) switches to the Wi-Fi connection mode in step S40.

Meanwhile, the built-in cam controller (BCC) determines whether the accident impact is more than the set value based on the signal obtained by the first impact sensor or the microphone.

To this end, the built-in cam controller (BCC) determines the amount of impact based on the sensing value acquired by the first impact sensor and/or acoustic data acquired by the microphone in step S50.

Here, in the case of acoustic data from a microphone, it may be determined whether the impact of the accident is more than the set value based on the decibel information.

Further, when the built-in cam controller (BCC) determines that the detected impact is an impact exceeding the set value (YES in S60), the built-in cam controller (BCC) determines whether there is a problem in power supply from the vehicle (HV) in step S70.

For example, when the power supplied from the vehicle (HV) is interrupted, or when information notifying that there is a problem in the vehicle (HV) power system is received from the vehicle controller (VC), the built-in cam controller (BCC) may determine that there is a problem in the power supply from the vehicle (HV).

If there is a problem with the vehicle (HV) power supply (YES in S70), the built-in cam controller (BCC) may use the emergency power charged in the super capacitor (SC) for subsequent operations.

That is, in step S80, a communication connection, for example, a Wi-Fi connection to the user terminal (SP), may be attempted using super capacitor (SC) power.

At this time, if the user terminal (SP) is switched to the Wi-Fi connection mode in step S40 (YES in S90), the built-in cam controller (BCC) uses the super capacitor (SC) power to complete the Wi-Fi connection with the user terminal (SP) in step S100.

Then, the built-in cam controller (BCC) transmits a video to the user terminal (SP) in step S110.

Here, the video may be from several to tens of minutes before the accident occurs to several to tens of minutes after the accident occurs.

Even if the power supply to the vehicle (HV) is interrupted due to an accident, the built-in cam controller (BCC) may save the video of the accident using the emergency power of the super capacitor (SC), and may send the video to the user terminal (SP) in step S110.

In addition, when the automatic transmission of the accident video has been set in advance (YES of S120), the user terminal (SP) that receives the accident video may send the video to a spot corresponding to contact information in step S130.

Here, the contact information may be contact information of a family member, a call center, etc.

Figure 3:
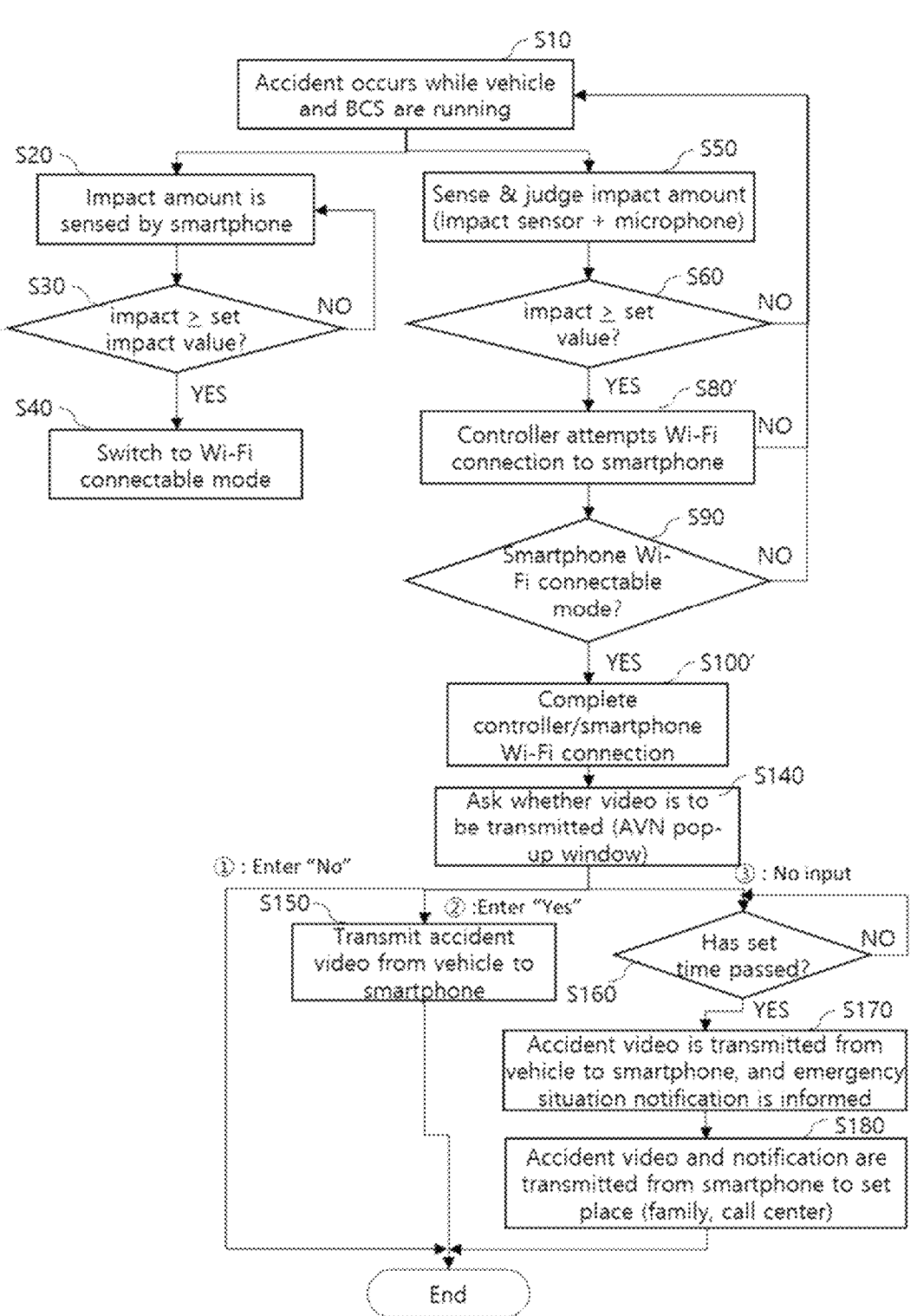
FIG. 3 shows a control process according to another embodiment of the present disclosure.

FIG. 3 shows another embodiment of the present disclosure, which will be described in detail below.

In the embodiment of FIG. 3, steps S10, S20, S30, S40, S50, S60, S90, etc. are the same as in the embodiment of FIG. 2, and therefore, the description thereof is omitted here.

In the embodiment of FIG. 3, there is no abnormality in the vehicle (HV) power supply, and therefore, the built-in cam controller (BCC) attempts to connect Wi-Fi to the user terminal (SP) using the vehicle (HV) power at step S80'.

If the mode of the user terminal SP is converted to a Wi-Fi connection mode at step S40 (YES of S90), the built-in cam controller (BCC) completes the Wi-Fi connection with the user terminal (SP) in step S100'.

In addition, the built-in cam controller (BCC) may output a pop-up window that inquires to the user whether the video is to be transmitted through the AVNT screen in step S140.

In this case, when a user enters "No", i.e., an order not to transmit the video, the built-in cam controller (BCC) does not send the accident video to the user terminal (SP).

However, when a user enters "Yes", i.e., an order to transmit the video, the built-in cam controller (BCC) transmits the accident video to the user terminal (SP) in step S150.

At this time, if the user does not enter either 'Yes' or 'No', that is, if there is no answer, the built-in cam controller (BCC) determines whether the no response time has reached the set time in step S160.

If the no response time has reached the set time, it may mean an emergency situation in which the user cannot even respond.

Therefore, when the no response time reaches the set time (YES in S160), the built-in cam controller (BCC) may transmit a notification indicating an emergency situation along with the video of the accident to the user terminal in step S170.

The user terminal (SP) that has received the video and the notification may automatically transmit the video and/or the notification to a device corresponding to preset contact information in step S180.

According to the above embodiments of the present disclosure, even when it is difficult to watch the accident video in the vehicle due to the accident, the video can be immediately watched through a user terminal such as a smartphone.

Additionally, according to the above embodiments, in an emergency situation where the driver is unconscious due to an accident, the accident video can be automatically transmitted to a third party such as a family member or a call center to inform them of the accident situation.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a video record system, the method comprising:

providing the video record system including at least one of an impact sensor or a microphone, a camera module configured to monitor around a vehicle, a first memory configured to store a video transmitted from the camera module, a controller including a second memory configured to store a computer program for controlling storage of the video, and a processor configured to execute the computer program;

determining, by the processor executing the computer program, whether an impact is equal to or greater than a set value based on a signal obtained by the impact sensor or the microphone; and attempting a communication connection to a user terminal and transmitting the video to the user terminal in response to determining that the impact is equal to or greater than the set value, wherein transmitting the video to the user terminal includes:

requesting a user's selection of whether to allow a transmission, and transmitting an emergency situation notification together with the video to the user terminal in response to the user's selection not being input for more than a set time.

2. The method of claim 1, wherein transmitting the video to the user terminal includes:

determining whether there is a problem in a power supply from the vehicle; and attempting a communication connection to the user terminal by being supplied power from a capacitor in response to determining that there is the problem in the power supply.

3. The method of claim 2, wherein transmitting the video to the user terminal further includes determining whether the user terminal is in a mode which allows the communication connection, and completing the communication connection by being supplied power from the capacitor.

4. The method of claim 2, wherein transmitting the video to the user terminal further includes transmitting the video to the user terminal by being supplied power from the capacitor.

5. The method of claim 1, wherein attempting the communication connection to the user terminal includes attempting the communication connection through a Wi-Fi module.

6. The method of claim 1, wherein requesting the user's selection includes requesting user's selection of whether to allow the transmission through an audio video navigation telecommunication (AVNT).

7. The method of claim 1, wherein transmitting the video to the user terminal further includes transmitting the video to the user terminal in response to the user's selection of allowing the transmission being input.

8. A video record system comprising:

an impact sensor or a microphone;

a camera module configured to monitor an area around a vehicle;

a first memory configured store a video transmitted from the camera module;

a controller including a second memory configured to store a computer program for controlling storage of the video, and a processor configured to execute the computer program, wherein, through executing the computer program, the processor is configured to:

determine whether an impact is equal to or greater than a set value based on a signal obtained by the impact sensor or the microphone; and attempt a communication connection to a user terminal and transmit the video to the user terminal in response to determining that the impact is equal to or greater than the set value, wherein transmitting the video to the user terminal includes:

requesting a user's selection of whether to allow a transmission, and transmitting the video to the user terminal in response to the user's selection of allowing the transmission being input, or transmitting an emergency situation notification together with the video to the user terminal in response to the user's selection not being input for more than a set time.

9. The video record system of claim 8, wherein the transmitting of the video to the user terminal includes:

determining whether there is a problem in a power supply from the vehicle; and attempting a communication connection to the user terminal by being supplied power from a capacitor in response to determining that there is the problem in the power supply.

10. The video record system of claim 9, wherein the transmitting of the video to the user terminal further includes determining whether the user terminal is in a mode which allows a communication connection, and completing the communication connection by being supplied power from the capacitor.

11. The video record system of claim 9, wherein the transmitting of the video to the user terminal further includes transmitting the video to the user terminal by being supplied power from the capacitor.

12. The video record system of claim 8, wherein the attempting the communication connection to the user terminal includes attempting a communication connection through a Wi-Fi module.

13. The video record system of claim 8, wherein requesting the user's selection includes requesting a user's selection of whether to allow the transmission through an audio video navigation telecommunication (AVNT).

14. A vehicle comprising the video record system of claim 8.

15. A user terminal communication-connectable with a video record system including a first impact sensor or a microphone, a camera module configured to monitor around a vehicle, a first memory configured to store a video transmitted from the camera module, and a controller including a second memory configured to store a computer program for controlling storage of the video, and a processor configured to execute the computer program, wherein the user terminal is configured to:

switch a mode of the user terminal a communication-connectable mode in response to determining that an impact sensed by a second impact sensor included in the user terminal is equal to or greater than a set impact value, and receive the video which the processor transmits to the user terminal in response of determining whether an impact is equal to or greater than a set value based on a signal obtained by the first impact sensor or the microphone, and attempting a communication connection to the user terminal according to a result of the determining that the impact is equal to or greater than the set value, through the executing of the computer program, wherein receiving the video at the user terminal includes:

requesting a user's selection of whether to allow a transmission, and receiving the video at the user terminal in response to the user's selection of allowing the transmission being input, or receiving an emergency situation notification together with the video at the user terminal in response to the user's selection not being input for more than a set time.

16. The user terminal of claim 15, wherein the user terminal is further configured to transmit the video to a set external device when the video is received.

*  *  *  *  *